United States Patent
Ludwig et al.

(10) Patent No.: US 7,627,659 B2
(45) Date of Patent: Dec. 1, 2009

(54) METHOD AND DEVICES FOR ADAPTIVE PROXYING OF FLOWS

(75) Inventors: Reiner Ludwig, Huertgenwald (DE); Michael Meyer, Aachen (DE); Norbert Niebert, Aachen (DE); Raphael Quinet, Liège (BE); Stefan Wager, Esbo (SE); Tormond Hegdahl, Olso (NO)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 920 days.

(21) Appl. No.: 10/511,944

(22) PCT Filed: Apr. 19, 2002

(86) PCT No.: PCT/IB02/02306

§ 371 (c)(1),
(2), (4) Date: May 2, 2005

(87) PCT Pub. No.: WO03/090417

PCT Pub. Date: Oct. 30, 2003

(65) Prior Publication Data

US 2005/0188101 A1 Aug. 25, 2005

(51) Int. Cl.
*G06F 15/173* (2006.01)
*G06F 13/40* (2006.01)
*G06F 15/00* (2006.01)

(52) U.S. Cl. ....................... 709/223; 709/238

(58) Field of Classification Search ............... 709/220, 709/201, 219, 217, 218, 249, 238, 232, 224, 709/226, 203; 707/501, 505, 506, 530, 513; 715/215; 370/230, 231, 232, 352, 389, 229; 713/199–202
See application file for complete search history.

(56) References Cited

U.S. PATENT DOCUMENTS 6,292,835 B1 * 9/2001 Huang et al. ............... 709/235

(Continued)

FOREIGN PATENT DOCUMENTS

DE     EP0948168 A1 * 3/1998

OTHER PUBLICATIONS

Spatscheck O et al: "Optimizing TCP forwarder performance" IEEE/AMC Transactions on Networking, Apr. 2000, IEEE;AMC, USA vol. 8, No. 2, pp. 146-157 XPoo2224927 ISSN: 1063-6692 Chapter III.
Zhe Xiang et al: "Cost-based replacement policy for multimedia proxy across wireless Internet" GLOBECOM'01. IEEE Global Telecommunications Conference (Cat. No. 01CH37270), GLOBECOM '01 ieee Global Telecommunications Conference, San Antonio, TX, USA Nov. 25-29, 2001 pp. 2009-2013 vol. 3 XP002224928.

(Continued)

*Primary Examiner*—Nathan J Flynn
*Assistant Examiner*—Mark O Afolabi

(57) ABSTRACT

This proxy for at least one end-to-end data flow in a network comprises an estimation unit, for estimating the current minimum data load necessary to occupy the bandwidth available to the flow in the network. The estimation unit outputs a flow's pipe capacity estimation. This proxy also comprises a comparison unit, for comparing the estimated pipe capacity with a predetermined capacity threshold, a decision unit, for deciding to proxy the end-to-end flow if the estimated pipe capacity lies above the capacity threshold, and a routing unit, for routing the flow according to the decision.

22 Claims, 3 Drawing Sheets

U.S. PATENT DOCUMENTS

| | | | | |
|---|---|---|---|---|
| 6,690,671 | B1* | 2/2004 | Anbiah et al. | 370/395.43 |
| 6,757,255 | B1* | 6/2004 | Aoki et al. | 370/252 |
| 7,130,268 | B2* | 10/2006 | Mascolo | 370/232 |
| 7,266,613 | B1* | 9/2007 | Brown et al. | 709/235 |
| 7,333,431 | B2* | 2/2008 | Wen et al. | 370/230.1 |
| 2002/0157019 | A1* | 10/2002 | Kadyk et al. | 713/201 |
| 2003/0084144 | A1* | 5/2003 | Lipinski | 709/224 |

OTHER PUBLICATIONS

Hari Balakrishnan and Randy H Katz, Computer Science Division Department of EECS University of California at Berkely: "Explicit Loss Notification and Wireless Web Performance" To Appear, Proc IEEE GLOBECOM Internet Mini-Conference, Sydney, Australia Nov. 1998.

* cited by examiner

METHOD AND DEVICES FOR ADAPTIVE PROXYING OF FLOWS

FIELD OF THE INVENTION

The present invention relates to a method and devices for adaptive proxying of flows.

The invention can be applied in the field of networks. It is described here, by way of non-limiting example, in its application to telecommunications networks.

BACKGROUND OF THE INVENTION

As is well known by a person skilled in the art, in the field of telecommunications networks, a proxy, in its widest meaning, is a computer system whose function is to act on behalf of a user, i.e. as an intermediary, between end-points, e.g. clients and servers, in a network.

A series of links connecting two hosts is called a path. Communication between two processes at each end of a path is referred to as end-to-end communication. Such a process is generally called a network end-point. End-to-end communication is provided by network (e.g. IP, Internet Protocol), transport and (optionally) application layer protocols, which are so-called end-to-end protocols. The term "layer" is for example known from the 7-layer OSI model but is not restricted to this model here and can denote a layer or sublayer in any network with a layered protocol stack.

The term "flow" is used herein to refer to an end-to-end stream of packets identified by a source IP address, a destination IP address, source and destination port numbers and a protocol identifier.

An end-to-end protocol runs between two hosts if it is of the unicast type, or between a number of hosts if it is of the multicast or broadcast type, at the transport, session, or application layer. The end-to-end path of an end-to-end protocol, i.e. the series of links connecting the various hosts, often runs across multiple (sub-)networks. Some networks may exhibit characteristics such as high delays and/or high packet loss rates that adversely affect the performance that an end-to-end protocol may otherwise provide. Such networks are hereinafter referred to as "problematic" networks.

A commonly used solution to this problem is the implementation of a proxy running either on one side, or on both sides of the problematic network, so as to modify the behaviour of the end-to-end protocol in such a way that the above-mentioned adverse effects are mitigated or even eliminated.

A so-called "network-adaptive" proxy is any form of a transport, session, or application layer proxy for an end-to-end protocol (whether it is of the uni-, multi-, or broadcast type) that utilises explicit information from a problematic network to control the proxy in such a way as to improve end-to-end performance.

A typical example of a transport layer proxy is a TCP proxy that splits an end-to-end connection into two independent TCP connections. FIG. 1 shows a connection with two TCP proxies $10_1$, $11_1$ that runs between a client 12 and a server 13 on both ends of the network. Therefore, the end-to-end connection is split into three independent TCP connections:

a first TCP connection through a network 14 in accordance with the Bluetooth or IrDa (Infrared Data association) standard, between the client 12 and a first proxy $11_1$, located e.g. in the user's mobile phone, a second TCP connection through a radio access network 15, between the first proxy $11_1$ and a second proxy $10_1$, located e.g. in a Gateway GPRS Support Node (GGSN) between the radio access network 15 and the Internet 16, and a third TCP connection through the Internet 16, between the second proxy $10_1$ and the server 13.

The proxies influence TCP's end-to-end congestion control behaviour in such a way as to be less impaired by large delays.

The proxies shown in FIG. 1 are so-called "network-blind" proxies, i.e. they operate on a transport protocol in that all entities below the transport layer, such as lower layer protocols, network nodes, etc., are treated as a "black box", without taking account of any of the parameters of these entities. The proxy state $17_1$ is therefore independent from these parameters.

On the other hand, FIG. 2 (in which the same reference signs as in FIG. 1 are used for similar entities) illustrates network-adaptive proxies $10_2$, $11_2$ because, for the same end-to-end connection between a client 12 and a server 13 and with the same locations of the proxies $10_2$, $11_2$ as in FIG. 1, the proxies utilise explicit information about the problematic network from below the transport layer. As shown in FIG. 2, there is signalling between the problematic network and the proxies, and the proxies receive for example local information 18 from the radio access network 15, which influences the proxy state $17_2$.

Since access to more information about a network's state usually allows a higher degree of optimisation, network-adaptive proxies are in general more effective in improving end-to-end performance.

Instances of what is defined here as a network-adaptive proxy are described in a White Paper by the company Packeteer, Inc., entitled "*Controlling TCP/IP Bandwidth*", updated November 1998, available at the Web address http://www.packeteer.com, and in a paper by H. Balakrishnan et al. entitled "*Explicit Loss Notification and Wireless Web Performance*", in Proc. IEEE Globecom, November 1998.

In these documents, specific items of local information that is known to the proxy are mentioned and are associated with specific actions performed on specific items of transport, session, or application layer state that a proxy maintains. However, other items of local information can be useful to a proxy and other actions associated with those other items of information are conceivable.

A proxy holds and maintains transport, session, or application layer state for each end-to-end connection that is proxied. Such state information may be described as a list of parameters, including e.g.:

measured, approximated or explicitly provided round trip times, inter-ACK arrival times, flow control windows, such as the congestion or the advertised window, retransmission timers, a list of TCP connections that are currently established or in the process of being established where the TCP client may potentially be served by the proxy (i.e. the connection may be proxied).

It is impossible to list all relevant parameters that might be useful to be maintained in a proxy. For example, future protocols might use parameters that are unknown or unused today. Let S be the transport, session, or application layer state that is maintained by the proxy. A network-adaptive proxy uses S to influence the performance of the end-to-end connection.

Likewise, let N be the current state of the problematic network as experienced by a specific end-to-end connection. N may include the following parameters:

the measured or assigned bit rate that is available to a particular connection within the problematic network, the delay that a particular connection experiences within the problematic network, the flow's pipe capacity, which is the minimum number of packets (i.e. the minimum load) a flow needs to have in flight to fully utilise its available bandwidth, and above which packets are queued in the network (the flow's pipe capacity can be approximated from the bit rate and the delay), the geographical location of the host that terminates a particular connection, such as the location of a mobile phone in a single cell, group of cells, or location area in a cellular network, the network load experienced in that part of the problematic network in which the host that terminates a particular connection is located.

The values of at least some of the above parameters may vary over time.

While a network-blind proxy has nothing but the state S defined above to influence the performance of the end-to-end connection, a network-adaptive proxy is capable of transforming the state S into a new state S*, using the current state N of the problematic network and a set of functions F, with the result that S* commonly improves end-to-end performance more than S does.

However, the shortcoming of the prior art network-adaptive proxies mentioned above is that they operate without taking account of the ratio between the effort of proxying and the potential performance improvement resulting from the proxying.

In fact, proxying an end-to-end connection is not always required in the sense that the benefit, i.e. the potential performance improvement, is only marginal and thus, does not justify the effort of proxying.

For example, there is usually little margin for improving the throughput of a TCP connection that only has a small pipe capacity (for instance, 2-4 transport layer segments) and experiences no or only a low rate of non-congestion related packet losses (e.g. packet losses caused by transmission errors). By contrast, a TCP connection that has a higher pipe capacity and/or experiences a higher rate of non-congestion related packet losses offers more margin for improving its throughput.

The pipe capacity is related to the flow's round trip time. A flow's round trip time (RTT) is the time it takes to send a packet from one network end-point to the other, get it processed at the receiving end-point, and send another packet back to the end-point that sent the initial packet. A flow's RTT varies dynamically, depending on such factors as packet size (transmission delays), queuing delays experienced by the packets in the network, and processing required at the receiving end-point. The packets a network end-point sends within the flow's RTT is called a flight of packets or simply a flight. Those packets are also referred to as the packets a network end-point has "in flight". The number of packets a network end-point has in flight is called the flow's load.

Meanwhile, proxying every transport connection that runs across the problematic network might pose a high demand for computing resources, namely, processor, memory, port numbers, etc. on the platform that runs the proxy. This demand might make it impractical to operate a proxy, for either cost or technical reasons or both.

The present invention aims at overcoming the above-mentioned drawbacks.

SUMMARY OF THE INVENTION

To this end, according to a first aspect, the present invention provides a proxy for at least one end-to-end data flow in a network, remarkable in that it comprises:

an estimation unit, for estimating a current minimum data load necessary to occupy a bandwidth available to the flow in the network, the estimation unit outputting a flow's pipe capacity estimation;

a comparison unit, for comparing the estimated pipe capacity with a predetermined capacity threshold;

a decision unit, for deciding to proxy the flow if the estimated pipe capacity lies above the capacity threshold; and a routing unit, for routing the flow according to the decision.

Thus, the present invention makes it possible to reduce the processing load of the host running the network-adaptive proxy, by only proxying those end-to-end connections for which a margin for performance improvement exists, while routing connections for which the effort of proxying is not justified by the potential benefit without proxying towards the end-points.

In this way, an optimised trade-off between processing load and an improved overall end-to-end performance of all flows can be achieved. The handling of the flow on the routing level avoids inter-layer processing for flows which are not proxied. The method is for example applicable in a mobile telephone network, e.g. a GSM or a UMTS network.

In a preferred embodiment, the routing unit is adapted to route from the network layer of the network to a higher protocol layer of the proxy, data that are to be transmitted through the end-to-end flow if the estimated pipe capacity lies above the capacity threshold.

This makes it possible to further process the data e.g. by applying to them a transcoding technique, by carrying out a flow splitting step or by using a packet caching technique. In the case of packet caching, all packets to be transmitted may be sent to the proxy in order to be available for further transmission on the flow's bottleneck link (i.e. the link on which the bandwidth available to the flow is the lowest of all links in the path) or for retransmission.

According to a particular feature, the capacity threshold depends on a processing load of the proxy, for example the capacity utilisation measured in terms of memory space, processing cycles, TCP port numbers or any combination thereof. The processing load may be the measured current processing load or a future processing load predicted by estimation.

Thus, adjusting the capacity threshold as a function of the processing load of the proxy makes it possible to enhance end-to-end performance by avoiding to pose too high demands on the platform that runs the proxy.

In a preferred embodiment, the proxy in accordance with the invention is network-adaptive in that the estimation unit is adapted to take into account local information received from the network and representing the state of the network.

In a preferred embodiment, the flow's pipe capacity estimation is based on the end-to-end worst-case round trip time and the bit rate available to the flow in the network. In this way, a simple estimation of the pipe capacity can be performed, even in case of varying conditions. An underestimation of the pipe capacity is avoided.

With the same object as above, the invention further provides a method for proxying at least one end-to-end data flow in a network, remarkable in that it comprises steps of:

estimating a current minimum data load necessary to occupy a bandwidth available to the flow in the network, so as to obtain a flow's pipe capacity estimation;

comparing the estimated pipe capacity with a predetermined capacity threshold;

deciding to proxy the flow if the estimated pipe capacity lies above the capacity threshold; and routing the flow according to the decision.

Moreover, the invention is applicable to any IP router or host and is particularly suited for any IP router or host at a wireless link.

The particular features and advantages of the proxying method are similar to those of the proxy as succinctly described above and are therefore not repeated here.

According to a second aspect of the invention, the data flow may be transmitted between a server and a client via a node in the network.

In such a case, the routing succinctly described above may be performed in the node, so that the flow is either transmitted directly from the client to the server (or vice versa), without using the proxy, or redirected into the proxy for processing, as a function of the result of the decision step. The estimation, comparison and decision steps may also be performed in the node or in another entity of the network, the results being transmitted to the node for the routing in the latter case. The node may be run by the same platform as a proxy but may nevertheless be an entity physically or logically different from the proxy.

Thus, according to its second aspect, the present invention provides a node in a wireless network, remarkable in that it comprises a unit adapted to route an end-to-end flow from a sending entity to a receiving entity in the network, either directly, or via a proxy, as a function of:

a flow's pipe capacity estimation, resulting from an estimation of a current minimum data load necessary to occupy a bandwidth available to the flow in the network, a comparison of the estimated pipe capacity with a predetermined capacity threshold, and a decision to proxy the flow if the estimated pipe capacity lies above the capacity threshold.

In a preferred embodiment, the proxy is as succinctly described above and is comprised in the node.

In a wireless telecommunications network, the node can for instance be a mobile phone, a base transceiver station, an SGSN (Serving GPRS Support Node) or a GGSN.

According to its second aspect, the present invention also provides a proxying method as succinctly described above, wherein the flow is transmitted between a sending entity and a receiving entity via a node in the network, the method being remarkable in that the routing is carried out in the node.

In this embodiment, if the estimated pipe capacity lies above the capacity threshold, the flow's data are routed from the network layer of the node to the network layer of the proxy and from there to a higher protocol layer of the proxy, processed in the higher layer of the proxy and sent on to the destination, e.g. directly or via said node.

This embodiment makes it possible to further reduce the processing load of the proxy and consequently to further enhance end-to-end performance. It is possible to use a standard proxy in this embodiment without the proposed routing functionality, the latter being implemented in the node. Furthermore, information easily available in the node can be used as input for the decision.

The present invention also provides a computer program product, loadable into a computer, comprising software code portions for implementing the steps of:

obtaining a flow's pipe capacity estimation, resulting from an estimation of a current minimum data load necessary to occupy a bandwidth available to the flow in the network, performing a comparison of the estimated pipe capacity with a predetermined capacity threshold, performing a decision to proxy the flow if the estimated pipe capacity lies above the capacity threshold, and initiating a routing of the flow according to the decision, when the product is run on a computer.

The advantages of the computer program product are similar to those of the proxy as succinctly described above and are therefore not repeated here.

Other features and advantages of the present invention will appear upon reading the following detailed description of preferred embodiments, given by way of non-limiting examples.

DETAILED DESCRIPTION OF THE DRAWINGS

Figure 1:
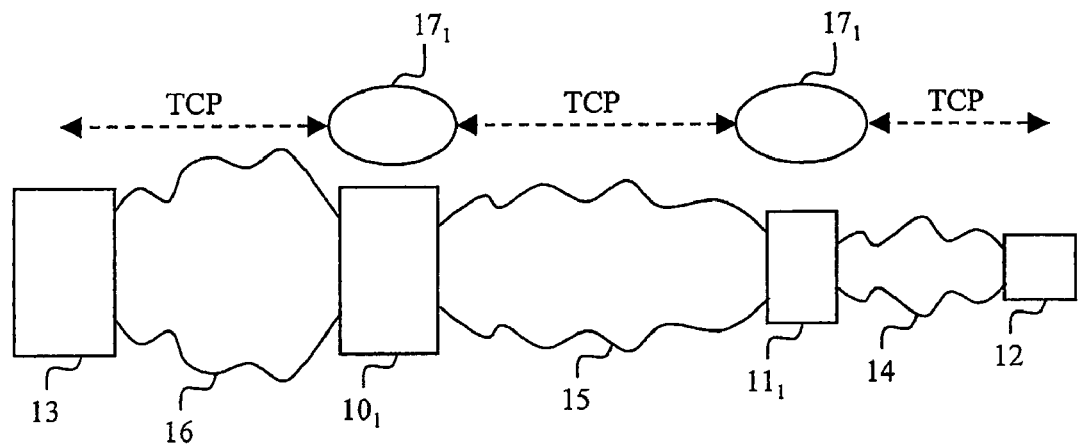
FIG. 1, described above, illustrates schematically a telecommunications network using conventional "network-blind" proxies.
Figure 2:
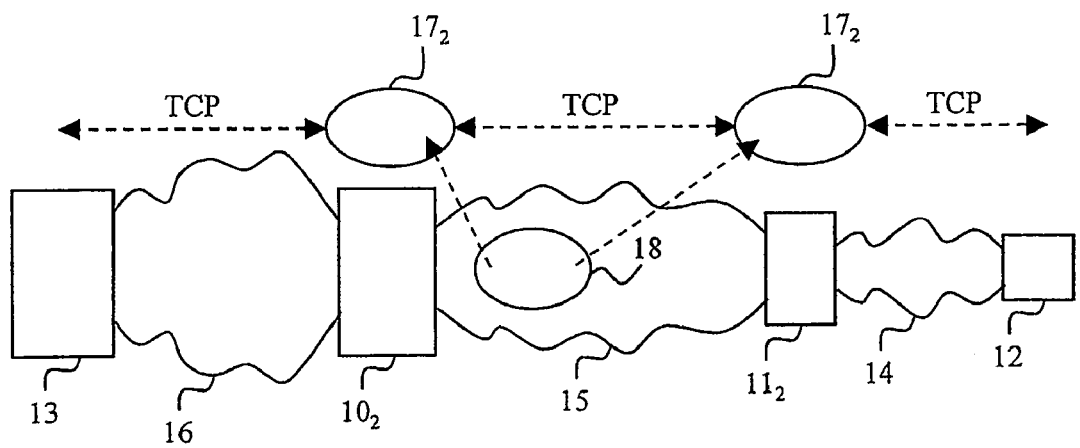
FIG. 2, described above, illustrates schematically a telecommunications network using conventional "network-adaptive" proxies.

The proxy according to the invention is of the "network-adaptive" type, i.e. the proxy takes into account local information received from the problematic network and representing the state of the network, as shown in FIG. 2 described previously.

In order to proxy only those end-to-end flows that have a sufficient margin for improving their performance, according to a preferred embodiment of the invention, the flow's current pipe capacity, that is to say, the current minimum data load necessary to occupy the bandwidth available to the flow in the network, is compared with a predetermined minimum value, referred to as a capacity threshold, and the flow is proxied if the current pipe capacity lies above that minimum value.

Figure 3:
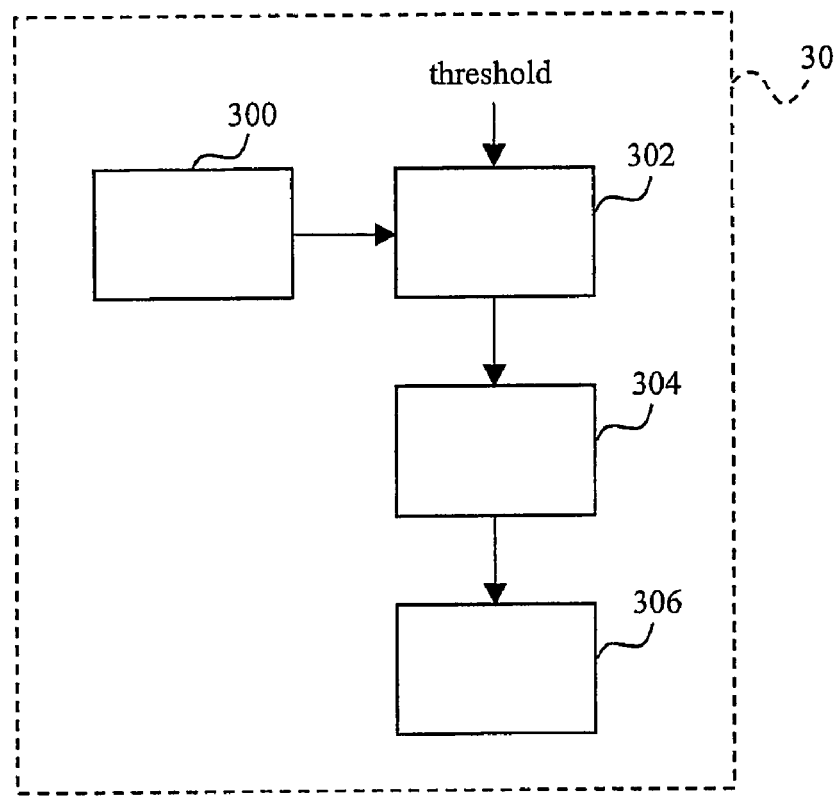
FIG. 3 is a block diagram showing the construction of a proxy in accordance with the first aspect of the present invention, in a preferred embodiment.

As shown in FIG. 3, in a preferred embodiment, a proxy 30 in accordance with the first aspect of the present invention, for at least one end-to-end flow in a network, comprises an estimation unit 300, adapted to estimate the current minimum data load necessary to occupy the bandwidth available to the flow in the network. Thus, the estimation unit 300 outputs an estimation of the flow's current pipe capacity.

The output of the estimation unit 300 is connected to the input of a comparison unit 302, which is controlled by a predetermined capacity threshold and is adapted to compare the estimated flow's current pipe capacity supplied by the estimation unit 300 with the capacity threshold. The capacity threshold may be expressed for example in bytes or as a number of packets.

The capacity threshold may depend on the processing load of the proxy. For example, the higher the processing load, the greater the capacity threshold chosen.

The output of the comparison unit 302 is connected to a decision unit 304, which is adapted to decide to proxy the end-to-end flow if the output of the comparison unit 302 indicates that the estimated pipe capacity is greater than the capacity threshold.

The output of the decision unit 304 is connected to the input of a routing unit 306, which is adapted to route the flow, either via the proxy, or without the proxy, as a function of the result of the decision output by the decision unit 304.

Figure 4:
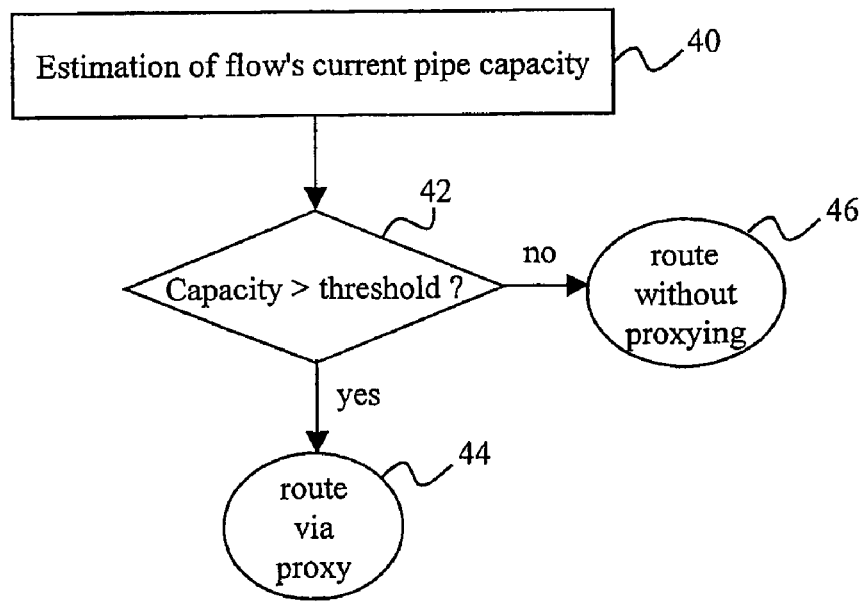
FIG. 4 is a flow diagram illustrating the main steps of a method for proxying an end-to-end data flow according to the present invention, in a preferred embodiment.

The operation of the proxy 30 is illustrated in FIG. 4. A first step 40 consists in estimating the flow's current pipe capacity. To this end, according to a preferred embodiment of the invention, the estimation unit 300 first calculates the sum of (i) the fixed worst-case end-to-end RTT (Round Trip Time) excluding the link's RTT and (ii) the link's RTT.

The estimation unit 300 then calculates the product of the obtained sum and the link's bit rate, so as to obtain the pipe capacity.

As shown in FIG. 4, the following step 42 is a test consisting in comparing the estimated flow's current pipe capacity with the capacity threshold. This comparison may be carried out either once at flow setup time, or periodically, or may be triggered by predetermined events, such as a change of the flow's pipe capacity that is signalled to the proxy from the problematic network. As a variant, the comparison step may be performed both at the time of setup of the flow and at regular time intervals, or both at the time of setup of the flow and when a change in the flow's pipe capacity is signalled by the network to the proxy.

In the case where the comparison step is performed at flow setup time, the following steps take place: after the proxy has detected that a new flow is setup, it queries the network about the bearer bit rate and the round trip time corresponding to the detected flow. For example, referring to the example illustrated in FIG. 2, the proxy may query a node that has access to a mobile phone's PDP (Packet Data Protocol) context information. Given the information acquired about the bit rate and the delay, the proxy estimates the flow's pipe capacity as indicated above and compares it with a preconfigured minimum.

In the case where the comparison step is performed when a change in the flow's pipe capacity is signalled by the network to the proxy, the following steps take place: the proxy receives a signal from the network every time the characteristics of an already running bearer, such as the bit rate, change. The received signal conveys the bearer bit rate and the delay. The proxy then checks whether active flows exist that run across that bearer and that are not currently proxied. If such flows exist, given the information received about the bit rate and the round trip time, the proxy estimates the flow's pipe capacity as indicated above and compares it with a preconfigured minimum.

In the case where the comparison step is performed at regular time intervals, the following steps take place: at regular time intervals, for each flow that is active but not proxied, the proxy queries the network (e.g. a node that has access to a mobile phone's PDP context information) about the bearer bit rate and delay over which the flow runs. Given the information acquired about the bit rate and the delay, the proxy estimates the flow's pipe capacity as indicated above and compares it with a preconfigured minimum.

In all cases described above, if the estimated flow's pipe capacity is greater than the capacity threshold, as shown in FIG. 4, the next step 44 consists in proxying the end-to-end flow. Otherwise, during the next step 46, the end-to-end flow is routed without proxying towards the destination.

Figure 5:
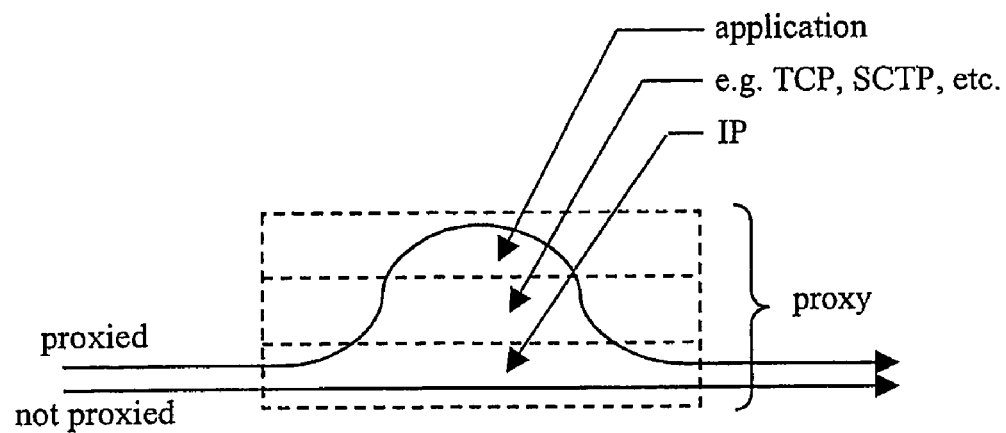
FIG. 5 is a graph illustrating the routing of data into the application layer of a proxy in accordance with the present invention, in a preferred embodiment.

Thus, as a result of the comparison step 42, it is decided at the network layer, e.g. an IP layer, whether the data packets of the flow are to be routed to the next hop (in case the flow is not proxied), or whether they are to be routed from the network layer into a higher protocol layer of the proxy (in case the flow is proxied), such as the application layer, as illustrated in FIG. 5.

Once the proxy has decided to proxy a flow, it is often advisable to leave the flow proxied until the lifetime of the flow ends, e.g. because it is required by the proxied protocol or to simplify the implementation. On the other hand, a proxy may decide to proxy a flow after that flow has begun, instead of proxying the flow from its start, for instance if the pipe capacity related to that flow increases during the lifetime of the flow.

Figure 6:
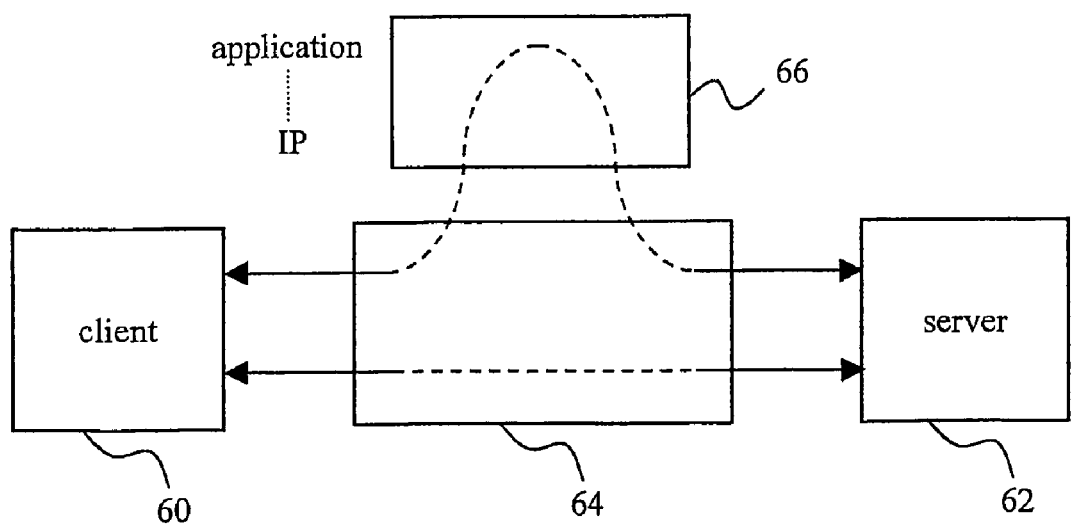
FIG. 6 illustrates schematically the implementation of a proxying method according to the second aspect of the invention.

According to the second aspect of the invention, the routing steps 44, 46 described above with reference to FIG. 4, optionally also the estimation, comparison and decision steps 40, 42, may be performed by an entity physically or logically separate from the proxy. This is the case in the variant shown in FIG. 6, wherein the data flows are exchanged by a client 60 and a server 62 via a node 64, such as a GGSN. The node 64 and a proxy 66 may be on the same platform although they are two separate entities.

In this variant, the routing decision is taken in the GGSN, either to send the flow directly from the sending entity (e.g. the client 60) to the receiving entity (e.g. the server 62), without using the proxy 66, or to redirect the flow to the proxy, as a function of the result of the decision step.

In case the GGSN 64 decides to send the flow to the proxy 66, the flow is then processed in a higher protocol layer of the proxy, such as the application layer, and is then sent back to the GGSN in order to be delivered to the receiving entity. In this variant, the decision of redirection of the flow and the processing of the flow are thus performed in different entities. It is also possible that the flow is sent on from proxy 66 directly towards the receiving entity, i.e. without passing again through node 64.

The invention claimed is:

1. A proxy computer system for at least one end-to-end data flow in a network, comprising:
   a processor and memory executing;
      an estimation unit, for estimating a current minimum data load necessary to occupy a bandwidth available to said flow in said network, said estimation unit outputting a flow's pipe capacity estimation;
      a comparison unit, for comparing said estimated pipe capacity with a predetermined capacity threshold;
      a decision unit, for deciding to proxy said flow if said estimated pipe capacity lies above said capacity threshold; and
      a routing unit, for routing said flow according to the decision.

2. A proxy computer system according to claim 1, wherein said routing unit is adapted to route from the network layer of said network to a higher protocol layer of said proxy, data that are to be transmitted through said end-to-end flow if said estimated pipe capacity lies above said capacity threshold.

3. A proxy computer system according to claim 1 wherein said capacity threshold depends on a processing load of said proxy.

4. A proxy computer system according to claim 1 wherein said estimation unit is adapted to take into account local information received from said network and representing the state of said network.

5. A proxy computer system according to claim 1 wherein said flow's pipe capacity estimation is based on the end-to-end worst-case round trip time and the bit rate available to said flow in said network.

6. A method for routing an end-to-end flow from a sending entity to a receiving entity in a wireless network, either directly, or via a proxy, comprising the steps of:
   estimating a flow's pipe capacity, resulting from an estimation of a current minimum data load necessary to occupy a bandwidth available to said flow in said network,
   comparing said estimated pipe capacity with a predetermined capacity threshold, and
   determining to proxy said flow if said estimated pipe capacity lies above said capacity threshold.

7. A method according to claim 6, wherein said end-to-end flow is routed from a network layer of said network to a higher protocol layer if said estimated pipe capacity lies above said capacity threshold.

8. A method according to claim 6 wherein said capacity threshold depends on a processing load involved in proxying.

9. A method according to claim 6 wherein said estimation step comprises the step of taking into account local information received from said network and representing the state of said network.

10. A method according to claim 6 wherein said flow's pipe capacity estimation is based on the end-to-end worst-case round trip time and the bit rate available to said flow in said network.

11. A method according claim 6 wherein said flow is transmitted between a sending entity and a receiving entity via a node in said network, said routing step is carried out in said node.

12. A method according claim 11 wherein the flow is routed from the node to a proxy, processed in said proxy and sent towards the receiving entity.

13. A method for proxying at least one end-to-end data flow in a network, characterised in that it comprises steps of:
   estimating a current minimum data load necessary to occupy a bandwidth available to said flow in said network, so as to obtain a flow's pipe capacity estimation;
   comparing said estimated pipe capacity with a predetermined capacity threshold;
   deciding to proxy said flow if said estimated pipe capacity lies above said capacity threshold; and
   routing said flow according to the decision.

14. A method according to claim 13, wherein said end-to-end flow is routed from the network layer of said network to a higher protocol layer if said estimated pipe capacity lies above said capacity threshold.

15. A method according to claim 13 wherein said capacity threshold depends on a processing load involved in proxying.

16. A method according to claim 13 wherein said estimation step comprises a step of taking into account local information received from said network and representing the state of said network.

17. A method according to claim 13 wherein said flow's pipe capacity estimation is based on the end-to-end worst-case round trip time and the bit rate available to said flow in said network.

18. A method according to claim 13 wherein said flow is transmitted between a sending entity and a receiving entity via a node in said network, wherein said routing step is carried out in said node.

19. A method according to claim 18, wherein the flow is routed from the node to a proxy, processed in said proxy and sent towards the receiving entity.

20. A proxy computer system for at least one end-to-end data flow in a network, comprising:
   a processor and memory executing,
   means for obtaining a flow's pipe capacity estimation, resulting from an estimation of a current minimum data load necessary to occupy a bandwidth available to said flow in said network,
   means for performing a comparison of said estimated pipe capacity with a predetermined capacity threshold,
   means for performing a decision to proxy said flow if said estimated pipe capacity lies above said capacity threshold, and
   means for initiating a routing of said flow according to the decision, when the product is run on a computer.

21. The proxy computer system according to claim 20 wherein said means for obtaining said pipe capacity estimation takes into account local information received from said network and representing the state of said network.

22. The proxy computer system according to claim 20 wherein said pipe capacity estimation is based on the end-to-end worst-case round trip time and the bit rate available to said flow in said network.

* * * * *